Patented July 25, 1950

2,516,332

UNITED STATES PATENT OFFICE 2,516,332

SYNTHESIS OF TRYPTOPHANE AND RELATED COMPOUNDS

Owen A. Moe and Donald T. Warner, Minneapolis, Minn., assignors to General Mills, Inc., a corporation of Delaware No Drawing. Application July 3, 1948, Serial No. 37,065

5 Claims. (Cl. 260—319)

The present invention relates to the synthesis of tryptophane and to related amino acids.

Various syntheses for tryptophane have been available. These have involved cumbersome tedious reactions and have entailed considerable expense, such that the resultant product had to be sold at a very high price. It has now been discovered that tryptophane may be synthesized from readily available materials such that the product may be produced at a reasonable price.

It is therefore an object of the present invention to provide a novel process of synthesizing tryptophane and related compounds.

The present application is a continuation-in-part of our copending application, Serial No. 648,020, entitled Aldehydo Compounds and Processes of Producing the Same, filed February 15, 1946, now abandoned. That application discloses the production of various aldehydo compounds as well as the synthesis of tryptophane from such aldehydo compounds. The aldehydo compounds disclosed have the following structural formula:

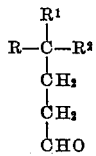

in which R is hydrogen, carboxyl, carboxylic acid ester, carbonamide (—CONH$_2$, —CONHR etc.), or nitrile; R$^1$ is carboxyl, carboxylic acid ester, carbonamide or nitrile; and R$^2$ is a substituted amino group in which one or both of the hydrogens have been replaced. These aldehydo compounds may be prepared in a variety of ways, one of which involves the 1,4 addition of various malonic esters to alpha,beta-unsaturated aldehydes. For example, the production of gamma-acetamido-gamma,gamma-dicarbethoxy butyraldehyde results from the 1,4 addition of ethyl acetamido malonate to acrolein in the presence of an alkaline condensation catalyst.

According to the present invention these aldehydes may be converted to tryptophane by reacting them with phenylhydrazine to produce the phenylhydrazone, cyclicizing the phenylhydrazone to form the substituted indole and then hydrolyzing and decarboxylating to produce tryptophane. The reactions are illustrated as follows:

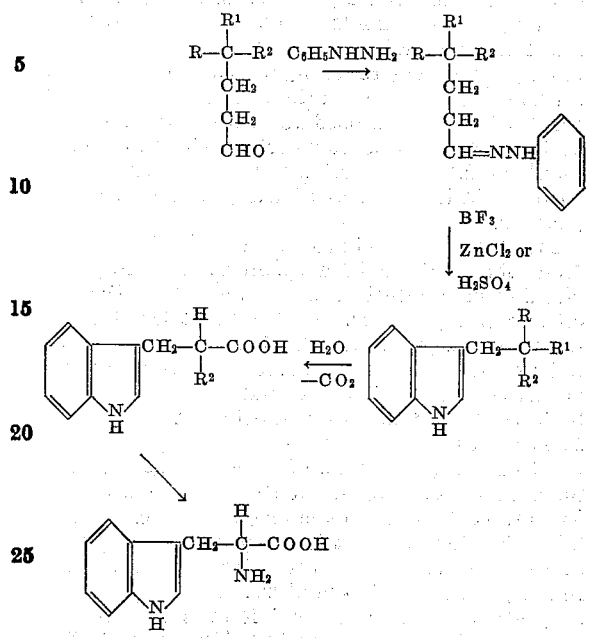

The description of the invention is with particular reference to the employment of gamma-acetamido-gamma,gamma-dicarbethoxy butyraldehyde inasmuch as this is the most convenient and readily available material to employ. It is to be understood, however, that the invention is not limited to this particular material, as will be apparent more fully hereinafter.

The above aldehyde is preferably prepared by the 1,4 addition of acetamido malonic ester to acrolein. This reaction is preferably carried out as follows: The acetamido malonic ester is dissolved in a solvent diluent and a small amount of an alkaline catalyst is added. Thereafter, the acrolein is added dropwise, and preferably the temperature is maintained below 50° C. Under these circumstances, a 1,4 addition is obtained resulting in the desired aldehyde. Typical of these operations is the use of absolute ethanol as the reaction diluent. Thus a small amount of metallic sodium may be reacted with a large volume of absolute ethyl alcohol to produce a solution of sodium ethoxide in alcohol, the sodium ethoxide being used as the alkaline condensation catalyst. To this resultant solution there may be added acetamido malonic ester to produce a mixture which is then preferably cooled. The acrolein may then be added slowly to this mixture and the temperature controlled to any desired range. The reaction mixture may then be allowed to stand for the required period for the reaction, after which the catalyst may be neutralized by means of glacial acetic acid.

In the preparation of tryptophane, it is not essential that the aldehyde be isolated. The reaction mixture containing the desired aldehyde may be converted directly to the phenylhydrazone. This may be accomplished by acidifying the reaction mixture slightly with glacial acetic acid and adding thereto phenylhydrazine, which results in the formation of the phenylhydrazone. The cyclization of the phenylhydrazone may be accomplished by adding concentrated sulfuric acid and heating the reaction mixture, for example to reflux temperature, for several hours, after which the reaction mixture is cooled to precipitate a small quantity of ammonium sulfate which may be removed by filtration. The filtrate is then concentrated and cooled to yield a precipitate of the ethyl-alpha-acetamido-alpha-carbethoxy-beta-(3-indole)-propionate. This substituted propionate may then be decarboxylated and hydrolyzed by refluxing for several hours with an aqueous alkaline solution. The reaction mixture is then neutralized to produce alpha-acetamido-alpha-carbethoxy-beta-(3-indole)-propionic acid. The reaction mixture is then cooled to precipitate as much of the propionic acid as possible.

It is thus possible to carry on the entire process from the addition of acrolein to the ethyl acetamido malonate to the point at which the cyclicized product is obtained without isolation of intermediate products. Yields by this process are not as large as are obtainable when the reaction is carried to the point of formation of the phenylhydrazone, and isolation effected at this point. It is usually preferable, therefore, to carry the reaction without isolation to the formation of the phenylhydrazone, to isolate the phenylhydrazone, to convert it to the indole propionic ester, to isolate this ester and then to carry on the hydrolysis and decarboxylation of the ester to tryptophane in a separate reaction mixture. It will be apparent, however, that it is possible to isolate the reaction product after each individual step in the process, if desired.

Excellent results have also been obtained by carrying on the addition of acrolein to ethyl acetamido malonate in benzene as a reaction solvent, in accordance with the same general process outlined above for the use of absolute ethanol.

Numerous modifications of the cyclization procedure may be employed. In place of using sulfuric acid in absolute ethanol, it has been found that improved results are obtained by using an aqueous ethanol as the reaction solvent or even by employing the heterogeneous phase reaction mixture provided by aqueous sulfuric acid. Surprisingly enough, even under these drastic cyclization conditions hydrolysis of ester groups was not effected.

The cyclization reaction may also be accomplished by using boron trifluoride as the acidic catalyst in an acetic acid reaction solvent. Yields by this procedure are not as satisfactory as with the aqueous sulfuric acid.

The hydrolysis and decarboxylation of the indole propionic acid product may also be conducted under a variety of conditions. Thus the propionic ester may be hydrolyzed with an aqueous alkaline solution to the free propionic acid, after which the alkaline reaction mixture may be neutralized and the free acid precipitated by cooling. This acid may then be refluxed with water to decarboxylate the propionic acid and produce N-acetyl tryptophane which product may be isolated by cooling to precipitate a white crystalline product. The N-acetyl tryptophane may then be further hydrolyzed to tryptophane by treatment with an aqueous alkaline solution.

EXAMPLE 1

*Preparation of tryptophane using absolute ethanol as a solvent*

100 parts of absolute ethyl alcohol were treated with 0.05 part of metallic sodium. When the reaction of the sodium was complete, 43.7 parts of ethyl acetamidomalonate were added. The resultant reaction mixture was a thick slurry, and it was cooled to 3° C. in an ice bath. Then 12.9 parts of acrolein were introduced dropwise. After the addition of approximately 4 parts of the acrolein, the reaction temperature had increased to 13° C. The introduction of the acrolein was interrupted, and the reaction temperature decreased to 8° C. The remainder of the acrolein was added at a rate such that the reaction temperature was maintained at 8-10° C. After the addition of the acrolein was complete, the reaction mixture was stirred for an additional 30 minute period. The solution was clear and light brown in color. During the addition of the acrolein, the solid initially present disappeared. This reaction appeared to proceed in an extremely smooth fashion. The clear, light-colored solution was cooled in an ice bath for an additional hour after which the catalyst was neutralized by the addition of 1.5 parts of glacial acetic acid dissolved in a small amount of ethanol. The pH of the reaction mixture at this point was between 4 and 6. The resulting mixture was placed in an ice box overnight. After standing overnight the solution was filtered and the solvent was removed by evaporation in vacuo. The residual oil was very clear and possessed a light yellow-brown color. This was gamma-acetamido-gamma,gamma-dicarbethoxy butyraldehyde.

Fourteen grams of the crude gamma,gamma-dicarbethoxy-gamma-acetamido butyraldehyde were dissolved in 40 ml. of absolute ethyl alcohol. Three grams of glacial acetic acid were added. Nine grams of phenylhydrazine were added to the reaction mixture and the clear solution was warmed to 50° C. The mixture was allowed to slowly cool to room temperature and after standing, the phenylhydrazone of gamma,gamma-dicarbethoxy-gamma-acetamido butyraldehyde began to precipitate as light yellow crystals (melting point 138-40° C.). The crystals thus precipitated were collected by filtration. The filtrate was diluted with water and yielded an additional quantity of the phenylhydrazone in a somewhat crude form.

Thirty-three parts of the phenylhydrazone of gamma, gamma-dicarbethoxy-gamma-acetamido butyraldehyde were dissolved in 62.4 parts of absolute ethyl alcohol containing one part of water and 15 parts of concentrated sulfuric acid. The reaction mixture was heated until the reflux temperature was attained and the reflux temperature was maintained for a period of 2½ hours. The reaction mixture was cooled to room temperature and placed in a refrigerator overnight. A small amount of ammonium sulfate precipitated from the clear amber liquid. The ammonium sulfate was removed by filtration and the filtrate, upon further concentration and cooling, yielded a copious precipitate. This precipitate was collected by filtration, washed with absolute ethyl alcohol, and a white crystalline solid was obtained (melting point 154–156° C.). Further concentration of the filtrate yielded additional quantities of this solid (melting point 150–155° C.). Finally, the alcoholic filtrate was diluted with an equivalent quantity of water and the product thus precipitated was collected by filtration. A substantial quantity of this crude material was obtained and it melted at 110–120° C. The white crystalline solid mentioned above was ethyl-alpha-acetamido-alpha - carbethoxy - beta-(3-indole)-propionate.

3.4 parts of ethyl-alpha-acetamido-alpha-carbethoxy-beta-(3-indole)-propicnate were refluxed for 2 and ¾ hours with an aqueous solution of sodium hydroxide containing 1.92 parts of sodium hydroxide dissolved in 19.2 parts of water. A light brown solution resulted. This solution was decolorized with about 0.1 part of carbon black and a clear, light yellow solution resulted. This alkaline solution was cooled in an ice bath and neutralized slowly with 5.9 parts of concentrated hydrochloric acid. The temperature of the reaction mixture was kept below 20° C. during the addition of the concentrated acid. A copious precipitate of alpha-acetamido-alpha-carboxy-beta-(3-indole)-propionic acid was formed. After cooling in the ice bath for 1½ hours, the light pink precipitate was collected by filtration. It was dried in a vacuum desiccator over calcium chloride for 16 hours. The product thus obtained melted at 141–143° C. (decomposition).

2.8 parts of alpha-acetamido-alpha-carboxy-beta-(3-indole)-propionic acid (melting point= 141–143° C. with decomposition) were mixed with 12 parts of water. The resulting aqueous mixture was refluxed for a period of 2 hours. Some separation of the N-acetyl tryptophane was observed as the refluxing proceeded. The decarboxylation appeared to be substantially complete after two hours, and the reaction mixture was cooled. Upon cooling, a white crystalline product was deposited. The crystalline product was collected by filtration and dried. This N-acetyl tryptophane melted at 202–204° C.

1.4 grams of N-acetyl tryptophane (melting point 202–204° C.) were dissolved in aqueous sodium hydroxide solution containing 1.5 g. of sodium hydroxide in 15 g. of water. The resulting reaction mixture was heated until the reflux temperature was attained. The reflux temperature was maintained for a period of 7–14 hours in an oil bath. The reaction mixture was then cooled and neutralized by the gradual addition of 2.4 g. of glacial acetic acid. As the addition of the glacial acetic acid progressed, a copious white precipitate was noted. The reaction mixture was chilled in an ice bath and the precipitated product was collected by filtration. The crude dl-tryptophane thus obtained melted at 255–263° C. (decomposition). Further purification of the material increased the melting point to 270–280° C. with decomposition.

EXAMPLE 2

Preparation of gamma-acetamido-gamma,gamma-dicarbethoxy-butyraldehyde using benzene as the reaction solvent The ethyl acetamidomalonate (217 g.) was suspended in a benzene solution (330 cc.) containing a catalytic quantity of sodium methoxide (0.5 g.). The resulting reaction mixture was cooled in a water bath at 19° C. Acrolein (68.5 cc.) dissolved in benzene (70 cc.) was added dropwise at a moderate rate. The temperature increased to 35° C. and after the addition of the alpha,beta-unsaturated aldehyde was complete, the reaction mixture was stirred for an additional two-hour period. After neutralization by the addition of the requisite quantity of glacial acetic acid (1 cc.), the reaction mixture was filtered and the clear light yellow filtrate was treated with glacial acetic acid (23 cc.) and phenylhydrazine (120 g.). The reaction mixture was warmed to 50° C. and the resulting solution was permitted to stand at room temperature for a period of three days. The phenylhydrazone was collected by filtration and washed with 150 cc. of benzene. After suspension in 250 cc. of benzene, the phenylhydrazone was collected and dried in vacuo. The yield of the phenylhydrazone of gamma-acetamido-gamma,gamma-dicarbethoxybutyraldehyde was 315.1 g. (87%) melting at 140–41° C., and it was nearly white in color.

EXAMPLE 3

Cyclization reaction using concentrated sulfuric acid in 50 volume percent aqueous ethanol Fifty grams (50 g.) of the phenylhydrazone of gamma-acetamido-gamma,gamma- dicarbethoxy butyraldehyde were mixed with 50 volume percent aqueous ethanol (62.5 cc. absolute ethanol and 62.5 cc. of water) containing 9 cc. of concentrated $H_2SO_4$. The resulting reaction mixture was refluxed for a seven-hour period. A clear solution was maintained throughout the entire reflux period. The resulting reaction mixture was cooled in the refrigerator overnight, and the crystalline product was collected by filtration, washed with water and dried in vacuo. The yield of ethyl - alpha - acetamido - alpha-carbethoxy-beta-(3-indole)-propionate melting at 153–4° C. was 28.8 g. which represents a 60% yield.

EXAMPLE 4

Cyclization reaction using concentrated sulfuric acid in 40 volume percent aqueous ethanol When the cyclization reaction was carried out with 40 volume percent aqueous ethanol using the same quantities of material as noted in Example 3, a clear solution was obtained as soon as the reflux temperature was reached. However, after about one hour the cyclicized product precipitated from the reaction mixture as an oil. The precipitated oil solidified on cooling, and the yield of the cyclicized product was comparable to that obtained in Example 3.

EXAMPLE 5

Cyclization reaction involving aqueous sulfuric acid

Fifty grams of the phenylhydrazone of gamma-acetamido-gamma,gamma - dicarbethoxy butyraldehyde were mixed with 300 cc. of water containing 14 cc. of concentrated sulfuric acid. The resulting reaction mixture was heated to the reflux temperature with very vigorous stirring. The phenylhydrazone appeared to liquefy at the reflux temperature, and after approximately one hour the liquid suspension was transformed to a solid suspension. The reflux temperature was maintained for a period of four and one-half hours. After cooling, the solid reaction product was collected and then mixed with water in a mixer. After filtration and washing with water, the desired product was dried in vacuo. The yield of cyclicized product obtained was 42.5 g. representing a 90% yield, and it melted at 145–9° C. Recrystallization from aqueous ethanol (50-50) gave 35 g. (73% yield) of ethyl-alpha-acetamido-alpha-carbethoxy-beta-(3 - indole) - propionate melting at 155–7° C.

EXAMPLE 6

*Cyclization reaction employing aqueous sulfuric acid*

Two hundred seventy grams (270 g.) of the phenylhydrazone of gamma-acetamido-gamma,-gamma-dicarbethoxy butyraldehyde were mixed with 1500 cc. of water containing 129 g. of concentrated sulfuric acid. The resulting reaction mixture was agitated vigorously as it was heated to the reflux temperature. After the reflux temperature had been attained, the solid phenylhydrazone was transformed to a liquid product which was finely dispersed in the aqueous phase. Within an hour the liquid product had been changed to a finely divided solid. The reflux temperature was maintained for a period of three hours. The reaction mixture was then cooled to room temperature and the solid cyclicized product was collected by filtration and washed with two liters of cold water. The reaction product was then mixed with water in a mixer, collected by filtration, washed with water and dried in vacuo. The dry cyclicized product weighed 229 g. and melted at 151–3° C. It was obtained as a light tan amorphous powder. After recrystallization from aqueous ethanol (50-50), 177 g. of ethyl-alpha - acetamido - alpha - carbethoxy-beta-(3-indole)-propionate melting at 156–7° C. was obtained.

EXAMPLE 7

*Cyclization reaction employing boron trifluoride as the acidic catalyst*

Thirty-six and three-tenths grams (36.3 g.) of the phenylhydrazone of gamma-acetamido-gamma,gamma - dicarbethoxy butyraldehyde were mixed with 100 cc. of glacial acetic acid. Fourteen and two-tenths (14.2 g.) of boron trifluoride etherate were added with swirling and the resulting reaction mixture was heated cautiously in an oil bath. The reflux temperature was maintained for a period of thirty minutes. A copious precipitate of the boron trifluoride-ammonia complex was noted, and after cooling it was removed by filtration. Water was added to the filtrate to yield a slight turbidity and the reaction mixture was cooled in the refrigerator overnight. The precipitated product (amorphous in appearance) was collected by filtration and dried in vacuo. The dried product weighed 13.8 g. and melted at 137–42° C. Recrystallization from 50 volume percent aqueous ethanol yielded 8.8 g. (25% yield) ethyl-alpha-carbethoxy-alpha-acetamido-beta-(3-indole)-propionate at 153° C.

While numerous modifications of the invention have been described, other modifications are also possible without departing from the spirit of the invention.

We claim as our invention:

1. Process of producing compounds having the formula

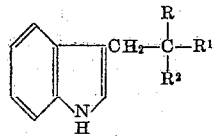

where R is carboxyalkyl; $R^1$ is selected from the group consisting of carboxyalkyl and nitrile; and $R^2$ is an acylamino group, which comprises reacting phenylhydrazine with a compound having the formula

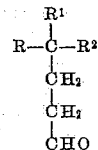

to form the phenylhydrazone, and cyclicizing the phenylhydrazone in the presence of a mixture of aqueous ethanol and sulfuric acid as a catalyst at reflux temperature to form the first mentioned compound.

2. Process of producing compounds having the formula

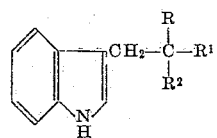

where R is carboxyalkyl; $R^1$ is selected from the group consisting of carboxyalkyl and nitrile; and $R^2$ is an acylamino group, which comprises reacting phenylhydrazine with a compound having the formula

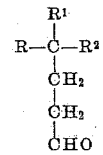

to form the phenylhydrazone, and cyclicizing the phenylhydrazone in the presence of aqueous sulfuric acid as the catalyst at reflux temperature to form the first mentioned compound.

3. Process of producing compounds having the formula

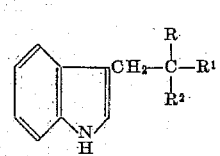

where R is carboxyalkyl; $R^1$ is selected from the group consisting of carboxyalkyl and nitrile; and $R^2$ is an acylamino group, which comprises reacting phenylhydrazine with a compound having the formula

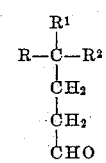

to form the phenylhydrazone, and cyclicizing the phenylhydrazone in the presence of a mixture of ethanol and sulfuric acid as catalyst at reflux temperature to form the first mentioned compound.

4. Process of producing compounds having the formula

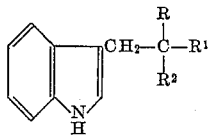

where R is carboxyalkyl; $R^1$ is selected from the group consisting of carboxyalkyl and nitrile; and $R^2$ is an acylamino group, which comprises reacting phenylhydrazine with a compound having the formula

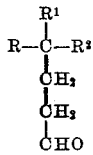

to form the phenylhydrazone, and cyclicizing the phenylhydrazone in the presence of dilute aqueous sulfuric acid as the catalyst at reflux temperature to form the first mentioned compound.

5. Process of producing ethyl-alpha-acetamido-alpha - carbethoxy - beta - (3 - indole) - propionate, which comprises reacting phenylhydrazine with gamma,gamma - dicarbethoxy-gamma-acetamido butyraldehyde to form the phenylhydrazone, and cyclicizing the phenylhydrazone in the presence of dilute aqueous sulfuric acid as the catalyst, at reflux temperature, to form the first mentioned compound.

OWEN A. MOE.
DONALD T. WARNER.

REFERENCES CITED

The following references are of record in the file of this patent:

UNITED STATES PATENTS

| Number | Name | Date |
| --- | --- | --- |
| 1,667,848 | Gassner | May 1, 1928 |
| 1,684,327 | Meig et al. | Sept. 11, 1928 |
| 2,447,544 | Snyder et al. | Aug. 24, 1948 |
| 2,447,545 | Snyder et al. | Aug. 24, 1948 |

OTHER REFERENCES

Ellinger: Berichte Deut. Chem. Gesell, 38 (1905), 2884–2888.

Snyder et al.: Jour. Am. Ch. Soc., 66 (March 1944), 350–351.

Albertson et al.: Jour. Am. Ch. Soc., 66 (March 1944), 500.

Certificate of Correction

Patent No. 2,516,332 — July 25, 1950

OWEN A. MOE ET AL.

It is hereby certified that error appears in the printed specification of the above numbered patent requiring correction as follows:

Column 7, line 55, after "two-tenths" insert the word *grams*; line 70, after "(25% yield)" insert *of*; line 71, after "propionate" insert *melting*; same line, for "153° C." read *153-5° C.*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*